(12) United States Patent
Ando

(10) Patent No.: US 7,468,755 B2
(45) Date of Patent: Dec. 23, 2008

(54) VIDEO SIGNAL RECEIVING DEVICE AND VIDEO SIGNAL RECEIVING METHOD

(75) Inventor: Morio Ando, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 505 days.

(21) Appl. No.: 11/087,636

(22) Filed: Mar. 24, 2005

(65) Prior Publication Data

US 2005/0259948 A1 Nov. 24, 2005

(30) Foreign Application Priority Data

May 10, 2004 (JP) ............................. 2004-139938

(51) Int. Cl.
*H04N 5/44* (2006.01)
(52) U.S. Cl. ..................... 348/553; 348/725; 348/558; 348/632; 348/738
(58) Field of Classification Search ................ 348/632, 348/706, 553, 552, 554, 558, 725, 729, 738, 348/736
See application file for complete search history.

(56) References Cited

U.S. PATENT DOCUMENTS

| | | | | |
|---|---|---|---|---|
| 6,914,637 | B1 * | 7/2005 | Wolf et al. ................... | 348/473 |
| 7,088,398 | B1 * | 8/2006 | Wolf et al. ............... | 348/423.1 |
| 7,228,154 | B2 * | 6/2007 | Champion et al. .......... | 455/557 |
| 7,269,673 | B2 * | 9/2007 | Kim et al. ..................... | 710/72 |
| 7,283,566 | B2 * | 10/2007 | Siemens et al. ............. | 370/486 |
| 2004/0239816 | A1 * | 12/2004 | Ando .......................... | 348/705 |
| 2005/0008323 | A1 * | 1/2005 | Han ............................ | 386/37 |
| 2005/0028211 | A1 | 2/2005 | Mochizuki et al. | |
| 2005/0136990 | A1 * | 6/2005 | Hardacker et al. .......... | 455/572 |
| 2006/0001554 | A1 * | 1/2006 | Morishita .................... | 341/50 |
| 2006/0077778 | A1 * | 4/2006 | Tatum et al. ............. | 369/44.11 |
| 2006/0089735 | A1 * | 4/2006 | Atkinson ..................... | 700/94 |
| 2006/0104617 | A1 * | 5/2006 | Mukaide et al. ............... | 386/97 |
| 2006/0156376 | A1 * | 7/2006 | Mukaide et al. ............. | 725/135 |
| 2006/0209880 | A1 * | 9/2006 | Chang et al. ................ | 370/464 |
| 2006/0209892 | A1 * | 9/2006 | MacMullan et al. ......... | 370/468 |

(Continued)

FOREIGN PATENT DOCUMENTS

JP 7-236101 9/1995

(Continued)

OTHER PUBLICATIONS

European Search Report dated Aug. 3, 2007 for Appln. No. 05101732.5-2202.

(Continued)

*Primary Examiner*—David L Ometz
*Assistant Examiner*—Jean W Désir
(74) *Attorney, Agent, or Firm*—Pillsbury Winthrop Shaw Pittman, LLP

(57) ABSTRACT

A video signal receiving device comprises signal processing units which separate video components and audio components from received signals conforming to HDMI standard, and carry out a decoding process on the components, respectively, to thereby restore analog video signals and audio signals, a detecting unit which detects a change in received signals to generate a first detection signal, and a detecting unit which detects a change in a received connection recognition signal to generate a second detection signal, and a mute control unit which carries out a mute process for the signal processing units not to output audio signals.

10 Claims, 3 Drawing Sheets

U.S. PATENT DOCUMENTS

2006/0256239 A1* 11/2006 Higashi ................. 348/553
2007/0192787 A1* 8/2007 Hong ..................... 725/25
2007/0206119 A1* 9/2007 Matsui et al. ........... 348/557
2007/0230909 A1* 10/2007 Mukaide et al. ......... 386/96

FOREIGN PATENT DOCUMENTS

JP       08-307789        11/1996
JP       2002-314970      10/2002

OTHER PUBLICATIONS

European Search Report dated Sep. 14, 2005 for Appln. No. 05101732.5-2202.

Stevan Eidson et al., "30.2: HDMI: High-Definition Multimedia Interface", vol. XXXVI, 2003, pp. 1024-1027, XP007008293.

* cited by examiner

VIDEO SIGNAL RECEIVING DEVICE AND VIDEO SIGNAL RECEIVING METHOD

CROSS-REFERENCE TO RELATED APPLICATIONS

This application is based upon and claims the benefit of priority from prior Japanese Patent Application No. 2004-139938, filed May 10, 2004, the entire contents of which are incorporated herein by reference.

BACKGROUND OF THE INVENTION

1. Field of the Invention

The present invention relates to a standardized digital transmission system that transmits digital video signals on which digital audio signals are multiplexed for a predetermined period, and more specifically, to a video signal receiving device and a video signal receiving method that receive transmitted digital video signals and carry out a specific control to digital audio signals.

2. Description of the Related Art

It is known that as a standard to transmit digital video signals, digital visual interface (DVI) standard has spread. In recent years, as a digital signal transmission standard further improved from the DVI standard, high definition multimedia interface (HDMI) standard has come to be adopted.

In the HDMI standard, various standards that are not specified in the DVI standard, such as, for example, that digital audio signals are multiplexed in a blanking period of digital video signals, thereby enabling audio transmission, that digital video signals can be transmitted in color difference YCbCr format as well as RGB format, that connection can be made by a universal serial bus (USB)-like small HDMI connector, and so forth, are specified.

Therefore, in configuring a digital transmission system in conformity to the HDMI standard, it is necessary to consider various aspects that have not been in transmission systems conforming to the DVI standard. For example, in the HDMI standard, audio transmission is available. Accordingly, if an HDMI connector is pulled or inserted while audio is received, or if audio signals change greatly, unpleasant noises such as a buzz noise or the like come out, which has been a problem in the prior art.

Jpn. Pat. Appln. KOKAI Publication No. 7-236101 discloses a configuration for preventing a buzz noise from occurring owing to discontinuity of audio data, and digital switching of data processing. Further, Jpn. Pat. Appln. KOKAI Publication No. 2000-314970 discloses a configuration of a system conforming to the DVI standard in which a source device side is controlled from a synch device side.

However, in these patent publications, there is no description concerning countermeasures against the occurrence of unpleasant noises at a receiver side in a digital transmission system conforming to the HDMI standard.

BRIEF SUMMARY OF THE INVENTION

According to one aspect of the present invention, there is provided a video signal receiving device comprising: an HDMI connector configured to be connected to a digital transmission bus that conforms to HDMI standard; an HDMI receiver configured to separate video components and audio components from digital signals received via the HDMI connector; signal processing units configured to carry out a decoding process on video signals and audio signals separated by the HDMI receiver, respectively, to thereby restore analog video signals and audio signals; a first detecting unit configured to detect a change to preset data in the digital signals received via the HDMI connector to thereby generate a first detection signal; a second detecting unit configured to detect a change in a connection recognition signal received via the HDMI connector to thereby generate a second detection signal; and a mute control unit configured to carry out a mute process for the signal processing units not to output the audio signals, at occurrence of the first detection signal or the second detection signal.

According to another aspect of the present invention, there is provided a video signal receiving method, comprising: separating video components and audio components from digital signals received via an HDMI connector to which a digital transmission bus that conforms to HDMI standard is connected; carrying out a decoding process on separated video signals and audio signals, and restoring analog video signals and audio signals; detecting a change to preset data in the digital signals received via the HDMI connector and generating a first detection signal; detecting a change in a connection recognition signal received via the HDMI connector and generating a second detection signal; and carrying out a mute process not to output the restored audio signals, at occurrence of the first detection signal or the second detection signal.

DETAILED DESCRIPTION OF THE INVENTION

Figure 1:
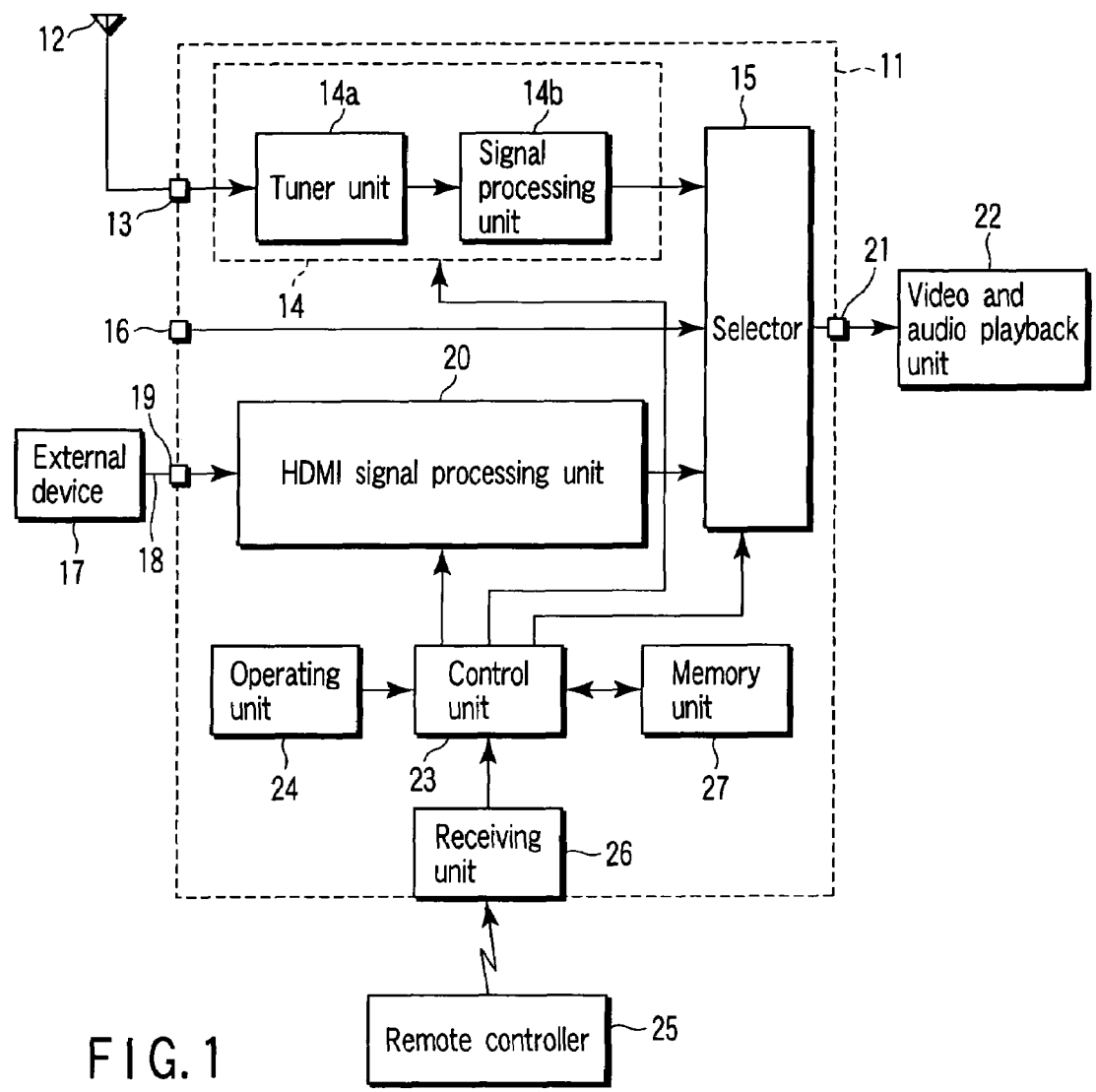
FIG. 1 is a block diagram showing a video signal receiving device according to an embodiment of the present invention.

With reference to the accompanying drawings, an embodiment of the present invention will be explained in details hereinafter. FIG. 1 shows a video signal receiving device 11 to be explained in this embodiment. The video signal receiving device 11 has a function of receiving television broadcast signals, a function of receiving analog video and audio signals, and a function of receiving digital video signals conforming to the HDMI standard.

Namely, television broadcast signals are received by an antenna 12, and supplied via a television (TV) input terminal 13 to a television signal processing unit 14. The television signal processing unit 14 takes out signals of a predetermined channel from input television broadcast signals by a tuner unit 14a, restores analog video signals and audio signals by a signal processing unit 14b, and outputs the restored signals to a selector 15.

The analog video signals and audio signals are received by an audio video (AV) input terminal 16, and are input to the selector 15 as they are.

Further, digital video and audio signals that are supplied from an external device 17 via a digital transmission bus 18 conforming to the HDMI standard are received by an HDMI connector 19, and supplied to an HDMI signal processing unit 20. The HDMI signal processing unit 20, whose details are explained later herein, restores analog video signals and audio signals from the input digital signals conforming to the HDMI standard, and outputs the restored signals to the selector 15.

Then, the selector 15 has a function of selectively switching the analog video and audio signals output from the television signal processing unit 14, the analog video and audio signals supplied to the AV input terminal 16, and the analog video and audio signals output from the HDMI signal processing unit 20, and guiding the signals to an AV output terminal 21.

In this manner, the analog video and audio signals output from the AV output terminal 21 are supplied to a video and audio playback unit 22 to be used for video display and audio playback.

Herein, in the video signal receiving device 11, all the operations thereof including the various receiving operations mentioned above are totally controlled by a control unit 23. The control unit 23 having a central processing unit (CPU) and the like receives operation information from an operating unit 24, or receives operation information sent out from a remote controller 25 via a receiving unit 26, and thereby controls the respective units so that the operation contents are executed.

In this case, the control unit 24 uses a memory unit 27. Namely, the memory unit 27 mainly includes a read only memory that stores a control program executed by the CPU of the control unit 24, a read and write memory that provides a working area to the CPU, and a nonvolatile memory to which various setting information, control information and the like are stored.

Figure 2:
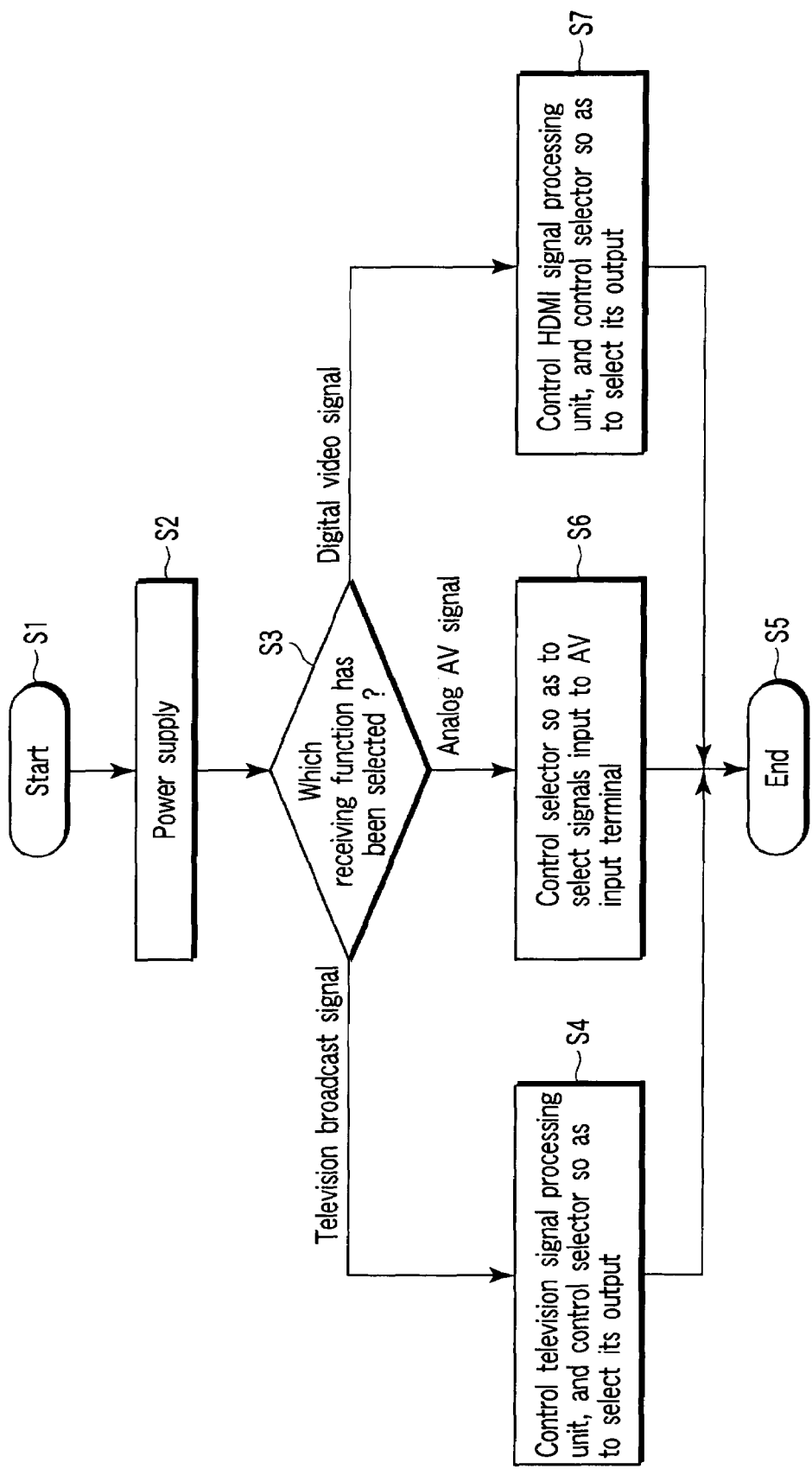
FIG. 2 is a flow chart showing entire operation of the video signal receiving device in the embodiment.

FIG. 2 is a flow chart showing entire operation of the above-mentioned video signal receiving device 11. First, when the operation is started (step S1), and the power source is supplied in step S2, the control unit 23 determines which receiving function has been selected in step S3.

In this case, if the function of receiving television broadcast signals is selected, the control unit 23 controls the television signal processing unit 14 in step S4, and controls the selector 15 so as to select the analog video and audio signals that are output from the television signal processing unit 14, and then completes the process (step S5).

In addition, when the function of receiving analog video and audio signals is selected in the above step S3, the control unit 23 controls the selector 15 so as to select the analog video and audio signals that are input to the AV input terminal 16 in step S6, and then completes the process (step S5).

Furthermore, when the function of receiving digital video signals conforming to the HDMI standard is selected in the above step S3, the control unit 23 controls the HDMI signal processing unit 20 in step S7, and controls the selector 15 so as to select the analog video and audio signals that are output from the HDMI signal processing unit 20, and then completes the process (step S5).

Figure 3:
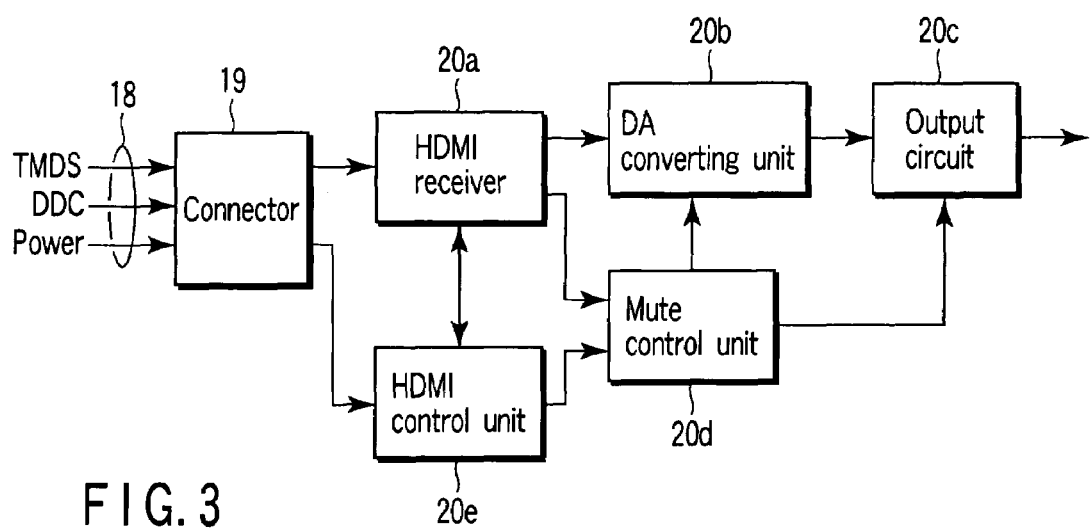
FIG. 3 is a block diagram showing details of an HDMI signal processing unit of the video signal receiving device in the embodiment.

FIG. 3 shows details of the above HDMI signal processing unit 20. Namely, the digital transmission bus 18 conforming to the HDMI standard mainly comprises three kinds of lines called TMDS, DDC, and Power.

Among these lines, the TMDS is used to transmit the digital video and audio signals conforming to the HDMI standard from the external device 17 to the HDMI connector 19 of the video signal receiving device 11. The DDC is used to transmit control data between the external device 17 and the video signal receiving device 11.

Meanwhile, the Power is used to apply constant voltage of, for example, around 5V from the external device 17 to the HDMI connector 19. This is used for the video signal receiving device 11 to detect the voltage level of the Power line of the HDMI connector 19 and thereby determine whether the external device 17 is connected or not, namely, it is used as a connection recognition signal.

The digital signals conforming to the HDMI standard that are received via the HDMI connector 19 are supplied to an HDMI receiver 20a. The HDMI receiver 20a separates video components and audio components from the input digital signals, and outputs them to a digital-analog (DA) converting unit 20b.

The DA converting unit 20b carries out a moving picture experts group (MPEG) decoding process on the input video components, and restores the components into analog video signals. Further, the DA converting unit 20b carries out a linear pulse code modulation (PCM) decoding process on the input audio components, and restores the components into analog audio signals.

Then, the analog video and audio signals output from the DA converting unit 29b are supplied via an output circuit 20c to the selector 15.

Further, when detecting any change of preset data in the received digital signals, the HDMI receiver 20a outputs a detection signal to a mute control unit 20d.

Herein, the operation of the HDMI receiver 20a mentioned above is controlled by an HDMI control unit 20e. The HDMI control unit 20e has, for example, a microcomputer or the like, and controls the operation of the HDMI receiver 20a under the control of the control unit 23.

Further, the HDMI control unit 20e monitors the voltage level of the Power of the HDMI connector 19. At any change in the voltage level, the HDMI control unit 20e detects that the HDMI connector 19 has been pulled and inserted, and outputs a detection signal to the mute control unit 20d.

The mute control unit 20d outputs a mute signal to the DA converting unit 20b and the output circuit 20c in a state where the detection signal is supplied from the HDMI receiver 20a, or in a state where the detection signal is supplied from the HDMI control unit 20e.

Then, in the DA converting unit 20b and the output circuit 20c, a mute process is carried out on audio signals, and in the video and audio playback unit 22, a control is made so that audio is not played back. Accordingly, it is possible to prevent unpleasant noises such as a buzz noise or the like from occurring when the HDMI connector 19 is pulled or inserted while audio is received, or when signal receiving conditions change greatly.

Figure 4:
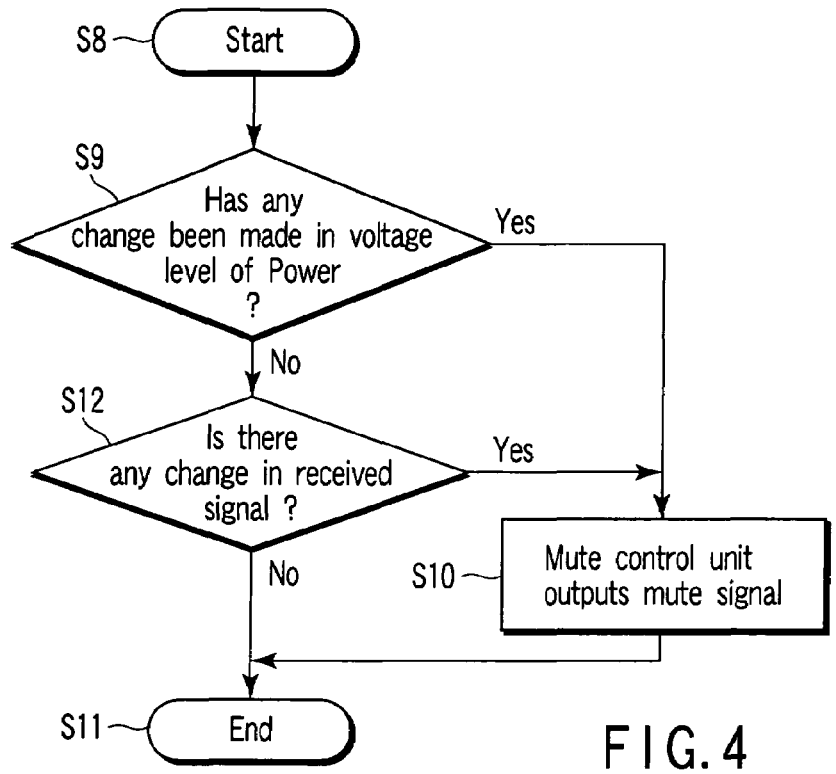
FIG. 4 is a flow chart showing operation of starting a mute process of the HDMI signal processing unit in the embodiment.

FIG. 4 is a flow chart showing operation of starting a mute process to audio signals. First, when the operation is started (step S8), in step S9, the HDMI control unit 20e determines whether any change has been made in the voltage level of the Power of the HDMI connector 19 or not.

When it is determined that a change has been made in the voltage level (YES), the HDMI control unit 20e generates a detection signal. Therefore, in step S10, the mute control unit 20d outputs a mute signal to the DA converting unit 20b and the output circuit 20c, and then completes the process (step S11).

On the other hand, when it is determined that any change has not been made in the voltage level of the Power of the HDMI connector 19 (NO), in step S12, the HDMI receiver 20a determines whether there is any change in preset data in the received digital signal or not. Note that the change of the received signals may be determined by, for example, whether the received signal could be set preferably with a low error ratio in a register in the HDMI receiver 20a or not.

When it is determined that a change has occurred in the received signal (YES), the HDMI receiver 20a generates a detection signal. Therefore, in step S10, the mute control unit 20d outputs a mute signal to the DA converting unit 20b and the output circuit 20c, and then completes the process (step S11).

Note that, when it is determined that any change has not been made in the received signal (NO) in the step S12, the HDMI receiver 20a does not generate a detection signal, and completes the process without carrying out the mute process (step S11).

Figure 5:
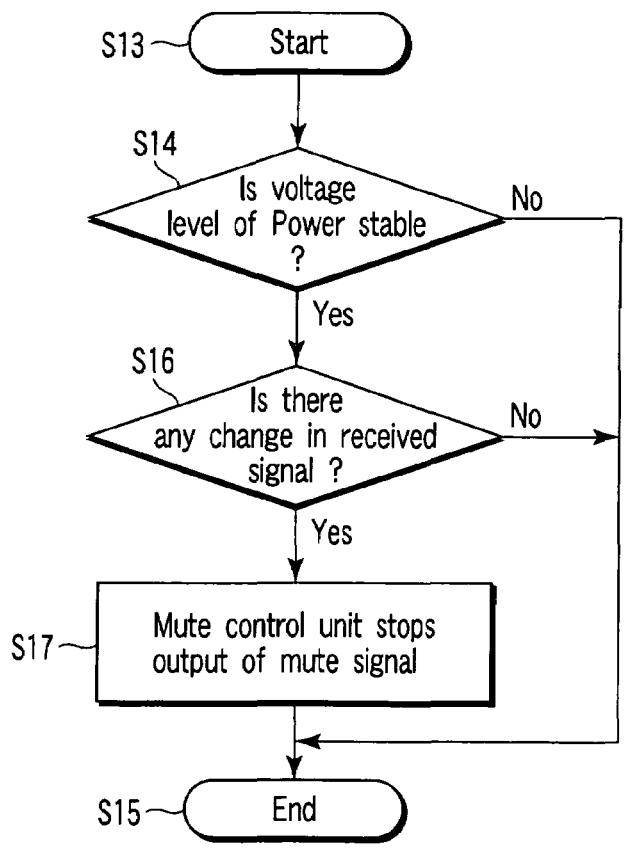
FIG. 5 is a flow chart showing operation of releasing the mute process of the HDMI signal processing unit in the embodiment.

FIG. 5 is a flow chart showing operation of releasing the mute process carried out as mentioned above. First, when the operation is started in an audio mute state (step S13), in step S14, the HDMI control unit 20e determines whether the voltage level of the Power of the HDMI connector 19 is stable at the specified value (5V) or not. When it is determined that the voltage level is not stable (NO), the HDMI control unit continues generating the detection signal as it is, continues the mute state and then completes the process (step S15).

On the other hand, when it is determined that the voltage level of the Power of the HDMI connector 19 is stable at the specified value (5V) (YES), the HDMI control unit 20e stops generating the detection signal.

Thereafter, in step S16, the HDMI receiver 20a determines whether there is any change to preset data in the received digital signal or hot. Then, when it is determined that a change has been made to preset data in the received digital signal (NO), the HDMI receiver 20a continues generating the detection signal as it is, continues the mute state and then completes the process (step S15).

On the other hand, when it is determined that there is no large change in the received signal in the step S16 (YES), the HDMI receiver 20a stops generating the detection signal. Accordingly, in step S17, the mute control unit 20d stops generating the mute signal, and then completes the process (step S15). Thereby, the mute process to the audio signals in the DA converting unit 20b and the output circuit 20c is released.

According to the above embodiment, when there occurs a change in the voltage level of the Power of the HDMI connector 19, or, when there occurs a change to the data preset in the received digital signal, the mute process is made on audio signals, so that it is possible to prevent the occurrence of unpleasant noises when audio is received at a practical level.

Further, the mute process is released in a state where both two conditions, i.e., a case where the voltage level of the Power of the HDMI connector 19 is stable at the specified value, and a case where there is not any change of data in the received digital signal, are satisfied. Therefore, also in this point, it is possible to prevent the occurrence of unpleasant noises when audio is received at a practical level.

Furthermore, since the mute control unit 20d supplies a mute signal to the DA converting unit 20b and the output circuit 20c, mute control can be made independently on the audio output from the DA converting unit 20b, and the audio output from the output circuit 29c. As a consequence, it is possible to improve the reliability of actions. Further, at necessity, it is also possible to change mute timings for the DA converting unit 20b and the output circuit 20c.

Note that the detection of the change in the voltage level of the Power of the HDMI connector 19 is not limited to the detection by use of the HDMI control unit 10e. For example, the Power terminal of the HDMI connector 19 may be connected directly to the mute control unit 20d, and thereby the mute control unit 20d may detect the change of the voltage level of the Power.

Furthermore, in the above embodiment, as the video signal receiving device 11, besides the video and audio playback unit 22, for example, a television broadcast receiver using a cathode ray tube (CRT), a television broadcast receiver using a liquid crystal screen, a projection type video display unit and the like may be employed.

Moreover, as the external device 17 that supplies digital video signals conforming to the HDMI standard to the video signal receiving device 11, for instance, a digital versatile disk (DVD) player, a digital-video home system (D-VHS) recorder, a set top box, a digital video camera and the like may be employed.

Still further, a switch for selecting whether to carry out audio mute or not may be arranged at the operating unit 24 or the remote controller 25, whereby, it is possible to make usability far more convenient.

The present invention is not limited to the embodiment mentioned above, but may be embodied in several modifications without departing from the sprit of the invention. Further, by appropriately combining the plural structural components disclosed in the above-described embodiment, various forms of the present invention may be embodied. For example, some structural components may be deleted from the entire structural components shown in the embodiment. Moreover, structural components in various embodiments may be combined appropriately.

What is claimed is:

1. A video signal receiving device comprising:
an HDMI connector configured to be connected to a digital transmission bus that conforms to HDMI standard;
an HDMI receiver configured to separate video components and audio components from digital signals received via the HDMI connector;
signal processing units configured to execute a decoding process on video signals and audio signals separated by the HDMI receiver, respectively, to restore analog video signals and audio signals;
a first detecting unit configured to detect a change in a receiving state based on the digital signals received via the HDMI connector and to output a first detection signal;
a second detecting unit configured to detect whether the HDMI connector has been disconnected, based on a connection recognition signal received via the HDMI connector,, and to output a second detection signal; and
a mute control unit configured to execute a mute process for the signal processing units not to output the audio signals, at occurrence of the first detection signal or the second detection signal.

2. The video signal receiving device according to claim 1, comprising a mute control unit adapted to release the mute process to the processing units, when the first and second detecting units stop generating both the first and second detection signals.

3. The video signal receiving device according to claim 1, wherein the first detecting unit is adapted to generate the first detection signal when the digital signals received via the HDMI connector cannot be set in a built-in register.

4. The video signal receiving device according to claim 1, wherein the second detecting unit is adapted to generate the second detection signal when there occurs a change in the voltage level of the connection recognition signal received via the HDMI connector.

5. The A video signal receiving device according to claim 1, wherein the signal processing units comprise:
  a restoring unit configured to execute a decoding process on video signals and audio signals separated by the HDMI receiver to thereby restore analog video signals and audio signals; and
  an output unit configured to output the analog video signals and audio signals restored by the restoring unit.

6. The video signal receiving device according to claim 5, wherein the mute control unit is adapted to execute a mute process for the restoring unit and the output unit not to output the audio signals.

7. A video signal receiving method, comprising:
  separating video components and audio components from digital signals received via an HDMI connector to which a digital transmission bus that conforms to HDMI standard is connected;
  executing a decoding process on separated video signals and audio signals, and restoring analog video signals and audio signals;
  detecting a change in a receiving state based on the digital signals received via the HDMI connector and to output a first detection signal;
  detecting whether the HDMI connector ahs been disconnected, based on a connection recognition signal received via the HDMI connector and to output a second detection signal; and
  executing a mute process not to output the restored audio signals, at occurrence of the first detection signal or the second detection signal.

8. The video signal receiving method according to claim 7, further comprising:
  releasing the mute process to the restored audio signals, at the moment when the occurrence of both the first and second detection signals is stopped.

9. The video signal receiving method according to claim 7, wherein the generating the first detection signal generates the first detection signal when the digital signals received via the HDMI connector cannot be set in a built-in register.

10. The A video signal receiving method according to claim 7, wherein the generating the second detection signal generates the second detection signal when there occurs a change in the voltage level of the connection recognition signal received via the HDMI connector.

* * * * *